United States Patent
Yamauchi et al.

(10) Patent No.: US 12,398,765 B2
(45) Date of Patent: Aug. 26, 2025

(54) POSITIVE CLUTCH

(71) Applicant: TSUBAKIMOTO CHAIN CO., Osaka (JP)

(72) Inventors: Masahiko Yamauchi, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/596,974

(22) Filed: Mar. 6, 2024

(65) Prior Publication Data

US 2024/0344568 A1    Oct. 17, 2024

(30) Foreign Application Priority Data

Apr. 17, 2023    (JP) .................................. 2023-067242

(51) Int. Cl.
    *F16D 41/066*    (2006.01)
(52) U.S. Cl.
    CPC .................................. *F16D 41/066* (2013.01)
(58) Field of Classification Search
    CPC ................. F16D 41/066; F16D 41/064; F16D 2041/0605; F16D 7/10; F16D 43/204
    See application file for complete search history.

(56) References Cited

U.S. PATENT DOCUMENTS

| | | | | |
|---|---|---|---|---|
| 11,002,321 B2 * | 5/2021 | Reimchen | ............... | F16D 28/00 |
| 2004/0206524 A1 | 10/2004 | Rahm | | |
| 2007/0074945 A1 * | 4/2007 | Ponson | ................. | F16D 43/211 |
| | | | | 192/41 A |
| 2010/0051402 A1 * | 3/2010 | Yamamoto | ............ | F16D 41/066 |
| | | | | 192/45.011 |
| 2016/0076604 A1 * | 3/2016 | Sturgin | ................. | F16D 41/088 |
| | | | | 192/41 R |
| 2019/0032760 A1 * | 1/2019 | Geiser | ................... | F16D 25/088 |

FOREIGN PATENT DOCUMENTS

| | | | | |
|---|---|---|---|---|
| DE | 4300083 A1 * | 7/1994 | .......... | F16D 41/066 |
| JP | 2005-505431 A | 2/2005 | | |
| JP | 2021-156432 A | 10/2021 | | |

* cited by examiner

*Primary Examiner* — Lori Wu
(74) *Attorney, Agent, or Firm* — WHDA, LLP (57) ABSTRACT

A plurality of rollers are disposed between an inner race and an outer race that are coaxial and relatively rotatable. The inner race and outer race are configured to engage with each other via part or all of the plurality of rollers that are held in a circumferential direction between roller support parts and pocket parts, the roller support parts being formed on one of an outer circumferential surface of the inner race and an inner circumferential surface of the outer race, and the pocket parts being formed on the other. A torque limiting member that applies a radial load on the rollers to press the rollers against the roller support parts is provided coaxially with the inner race and the outer race. The torque limiting member is flat and annular in an axial direction and resiliently deformable in a radial direction.

6 Claims, 12 Drawing Sheets

POSITIVE CLUTCH

BACKGROUND OF THE INVENTION

1. Field of the Invention

The present invention relates to a positive clutch equipped with a torque limiter.

2. Description of the Related Art

It is known that some clutches that transmit or interrupt torque from an input shaft to an output shaft are equipped with torque limiters to prevent transmission of excessive torque.

Known torque limiters include frictional torque limiters that use a tolerance ring or frictional plate, or mechanical torque limiters that use, for example, balls and biasing means that applies a force to the balls in the axial or radial direction. Examples of the biasing means include coil springs, disc springs, and plate springs.

Japanese Patent Application Publication No. 2021-156432, for example, discloses a torque limiter, in which a tolerance ring is set either between an outer circumferential surface of an outer race and an inner circumferential surface of a torque input member, or between an outer circumferential surface of an inner race and an outer circumferential surface of a torque input member. When torque exceeding a preset level is applied, the clutch slips between the inner race, the outer race or the torque input member, and the tolerance ring. The torque limiter thus limits the torque transmission.

Japanese Translation of PCT Application No. 2005-505431 discloses a torque limiter, wherein a circular plate spring is provided to apply a force to balls, which are fitted in holes, to be pushed toward one side. When an excessive torque is applied, for example, the plate spring radially expands through resilient deformation, pressing the balls out of respective holes thereof. This action serves to limit the torque transmission.

SUMMARY OF THE INVENTION

Many frictional torque limiters, including the one described in Japanese Patent Application Publication No. 2021-156432, rely heavily on the friction coefficient of the friction plate. With a friction plate making sliding contact when the clutch is tripped (during torque transmission interruption), with a clutch equipped with such a torque limiter it is difficult to control the torque limit load in response to changes in ambient conditions. After repeated tripping, wear may compromise durability and the limit load may become unstable.

Mechanical torque limiters that use biasing means such as plate springs, including the one described in Japanese Translation of PCT Application No. 2005-505431, cannot easily generate high torque and necessitate a considerable installation space for the biasing means. Therefore, these torque limiters are not well-suited for power transmission applications in vehicles, for which high torque and space saving are required. Other issues that have to be addressed include an increased number of components and higher production costs. Moreover, the torque limiter requires positioning of the plate spring.

The present invention has been made based on the circumstances described above and it is an object of the present invention to provide a positive clutch with a simple structure, exhibiting high durability against wear, excellent sliding characteristics, size reduction capability, extended service life, and the capacity to handle high torque.

The present invention achieves the above object by providing a positive clutch including: an inner race and an outer race that are coaxial and rotatable relative to each other; and a plurality of rollers disposed between the inner race and the outer race and transmitting or interrupting torque, the inner race and the outer race being configured to engage with each other via part or all of the plurality of rollers held in a circumferential direction between roller support parts and pocket parts, the roller support parts being formed on one of an outer circumferential surface of the inner race and an inner circumferential surface of the outer race, and the pocket parts being formed on the other of the outer circumferential surface of the inner race and the inner circumferential surface of the outer race and being configured to accommodate the rollers. The positive clutch further includes a torque limiting member that applies a radial load on the rollers to press the rollers against the roller support parts, the torque limiting member being coaxial with the inner race and the outer race, and being flat and annular in an axial direction, and moreover being resiliently deformable in a radial direction.

According to one aspect of embodiments, the torque limiting member is capable of applying a large radial preload. The axially flat, annular structure allows the torque limiting member to be installed in a confined space. Therefore, the clutch is capable of handling high torque with a simple structure, and can be made smaller.

The torque limit load can be set based on the resilience of the torque limiting member and the friction between the sliding surfaces of the rollers and the pocket parts. That is, the torque limit load can readily be tailored without dependence on friction coefficients. This helps reduce potential wear on the sliding parts and improve durability. The clutch can thus achieve both compactness and performance stability.

Moreover, the rollers that are engaging elements, via which the inner race and the outer race engage, are used as components for causing resilient deformation of the torque limiting member. This enables a reduction in the number of components, which in turn facilitates cost savings, size reduction, and structural simplification.

According to another aspect of embodiments, the torque limiting member is a spiral retaining ring, which is circumferentially continuous, so that there is no need for phase matching during its assembly. The number of turns of coiling of the spiral retaining ring may be increased to help disperse the stress applied to the ring, ensure strength, and improve durability.

According to another aspect of embodiments, the rollers each have an outer circumferential surface serving as a retaining ring receiving surface. The number of components is thus reduced, which facilitates structural simplification and cost reduction. When the clutch is tripped, the rollers roll between the torque limiting member, inner race, and outer race. Therefore, durability against wear is improved.

Since the torque limiting member is provided so as to apply a load to both axial ends of each roller, the rollers are pressed down in a stable manner, which can contribute to better performance stability. The torque limiting member may be provided such that its outer circumferential surface makes contact with the retaining ring receiving surfaces of the rollers. In this case, the centrifugal force during high-speed rotation assists the loading and enables the clutch to handle high torque.

According to another aspect of embodiments, there is an angle difference between a wall surface of the roller support part and a wall surface of the pocket part that hold each of the rollers. This angle difference allows for change of the proportion of the torque limit load carried by the friction between the sliding surfaces of the rollers and the pocket parts, and the torque limit load carried by the resilience of the torque limiting member. This helps improve performance stability. Moreover, it is possible to customize the trip torque based on the rotating direction of one of the inner race and outer race relative to the other.

According to another aspect of embodiments, the positive clutch is configured as a selectable clutch that can switch operating modes thereof. This clutch includes a torque limiter with a piston mechanism that uses the torque limiting member described above. The clutch can thus achieve both compactness and performance stability. The torque limit load can be changed based on whether the rotating direction is forward or reverse. Moreover, the torque limiting function may be provided for only one of the forward and reverse directions. This offers a high degree of design freedom.

DESCRIPTION OF THE PREFERRED EMBODIMENTS

Hereinafter, embodiments of the present invention will be described with reference to the drawings.

First Embodiment

As shown in FIG. 1 to FIG. 4, the positive clutch 100 according to the first embodiment includes an inner race 110 and an outer race 115 rotatable about the same axis relative to each other, a plurality of rollers 130 disposed between the inner race 110 and the outer race 115 for transmission or interruption of torque, and side plates 140, one each fixed to the front side and rear side of the inner race 110 with screws, for example, and covering the front side and rear side in the axial direction of the inner race. Reference symbol C in FIG. 1 to FIG. 3 denotes the rotation axis.

The inner race 110 is a cylindrical member with roller support parts 121 formed at predetermined circumferential intervals on the outer circumferential surface for supporting the lower side of the rollers 130. The roller support parts 121 are formed as recessed grooves with a circular arc cross-sectional shape, for example, extending in the direction of the rotation axis. The opening edge of the roller support part 121 is chamfered, for example, as viewed in cross section, which helps facilitate the rolling of the rollers 130 and reduce the ratchet noise.

The outer race 115 is an annular plate member with pocket parts 125 configured to accommodate the rollers 130 and formed at predetermined circumferential intervals on the inner circumferential surface, each corresponding to each of the roller support parts 121. The pocket parts 125 are formed as recessed grooves extending in the direction of the rotation axis and having a cross-sectional shape that is formed by an isosceles trapezoid and a circle that passes through the vertices of the two equal sides, for example.

The rollers 130 are columnar, accommodated in the pocket parts 125 of the outer race 115 such as to be rollable, and supported by the roller support parts 121 of the inner race 110. The positive clutch 100 of this embodiment is configured such that the inner race 110 and outer race 115 engage via the rollers 130, which are held between the roller support parts 121 and the pocket parts 125 in the circumferential direction when one of the inner race 110 and outer race 115 is rotated relative to the other in the forward or reverse direction. Therefore, no windup or torsional deflection occurs during engagement. The clutch thus has high rigidity and is capable of stable engagement with a simple structure. With a large number of rollers 130 accommodated in a small space, the clutch is able to transmit high torque despite the small size. The large number of rollers also enables a reduction in the surface pressure that acts on the roller support parts 121 and pocket parts 125 as well as on the rollers 130 during engagement. This allows the clutch to be designed with inexpensive materials that are more resistant to chipping, which may be caused by impact, or wear. The rollers 130 rotating themselves and substantially not engaging at the same point allow the durability of the clutch to be improved and the service life to be extended.

The positive clutch 100 according to this embodiment includes ring-like torque limiting members 150 that are resiliently deformable in the radial direction, flat in the axial direction, and coaxial with the inner race 110 and outer race 115, for applying a radial load on each of the rollers 130.

Figure 1:
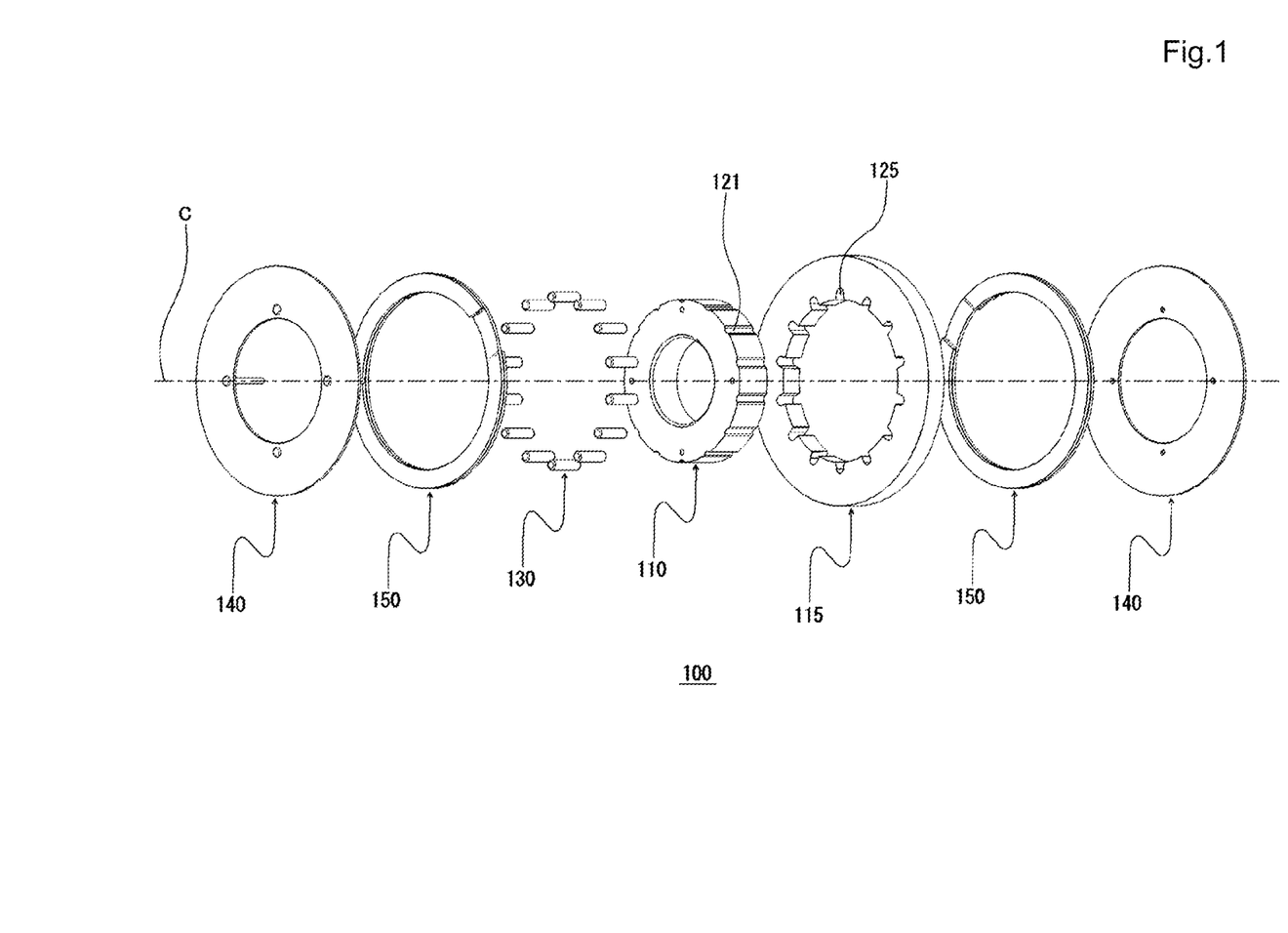
FIG. 1 is an exploded perspective view illustrating a configuration example of a positive clutch according to a first embodiment of the present invention.
Figure 2:
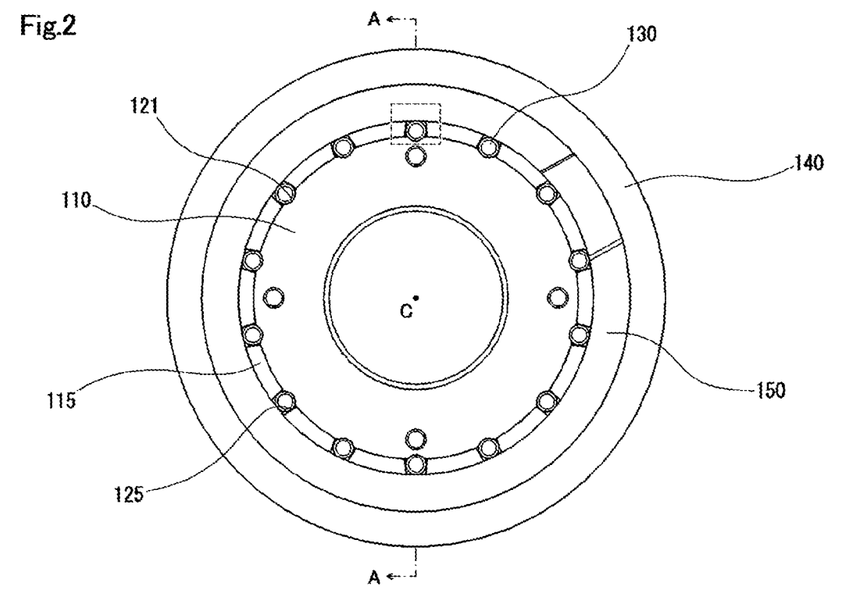
FIG. 2 is a plan view from the front in the axial direction illustrating the configuration of the positive clutch shown in FIG. 1 with some parts omitted.

The torque limiting member 150 in this embodiment is a spiral retaining ring made by coiling flat wire into a ring-like shape that lies flat in the axial direction. This embodiment uses a spiral retaining ring with two turns of flat wire.

Figure 3:
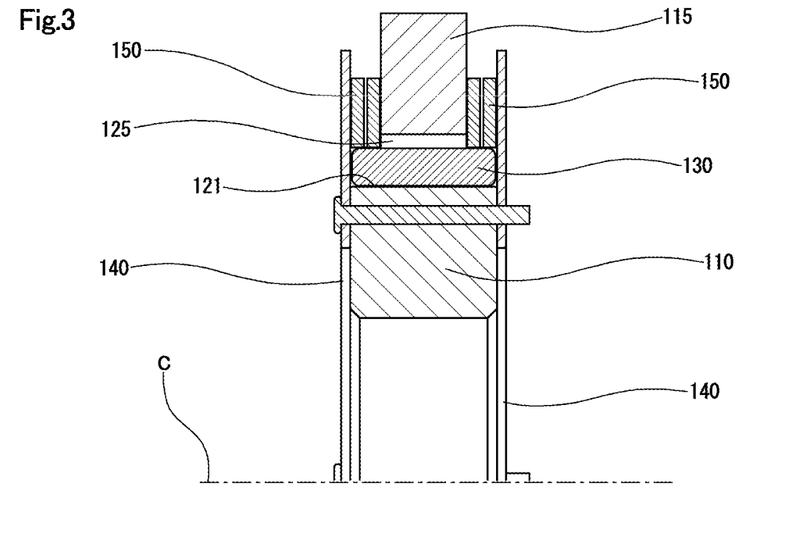
FIG. 3 is a cross-sectional view illustrating a part of the section A-A in FIG. 2.

In the positive clutch 100 of this embodiment, the outer circumferential surface of each roller 130 serves as a retaining ring receiving surface. The torque limiting members 150 are fitted on the front side and the rear side of the outer race 115 such that their inner circumferential surfaces make contact with the respective retaining ring receiving surfaces of the rollers 130. The rollers 130 are each loaded radially at both axial ends so that the rollers 130 are pressed against their respective roller support parts 121.

The outer circumferential surface of each roller 130 serving as a retaining ring receiving surface helps reduce the number of components, facilitating structural simplification as well as cost reduction. When the clutch is tripped, the rollers 130 roll between the torque limiting members 150, inner race 110, and outer race 115. Therefore, durability against wear is improved.

Since the torque limiting members 150 are provided such as to apply a load to both axial ends of each roller 130, the rollers 130 are pressed down in a stable manner, which can contribute to better performance stability.

Figure 4:
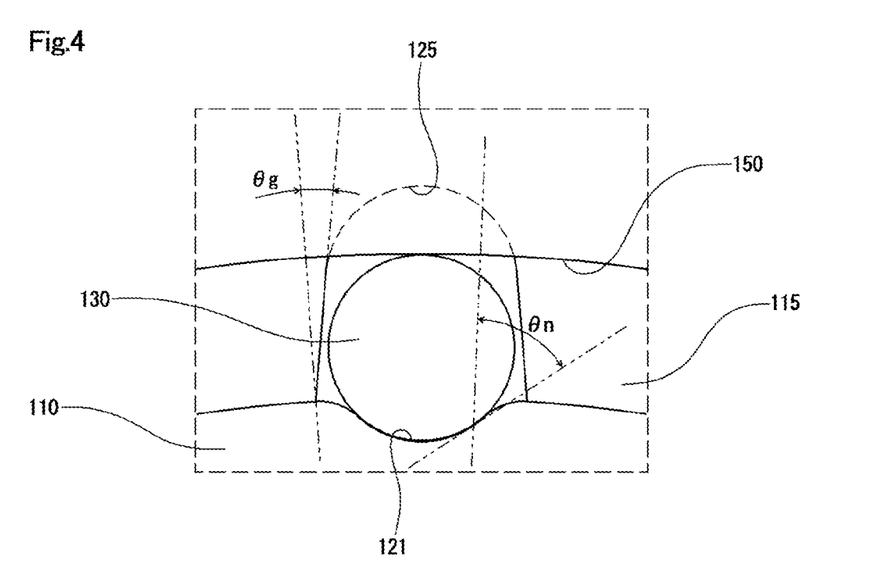
FIG. 4 is an enlarged view of the region encircled with a broken line in FIG. 2.
Figure 5:
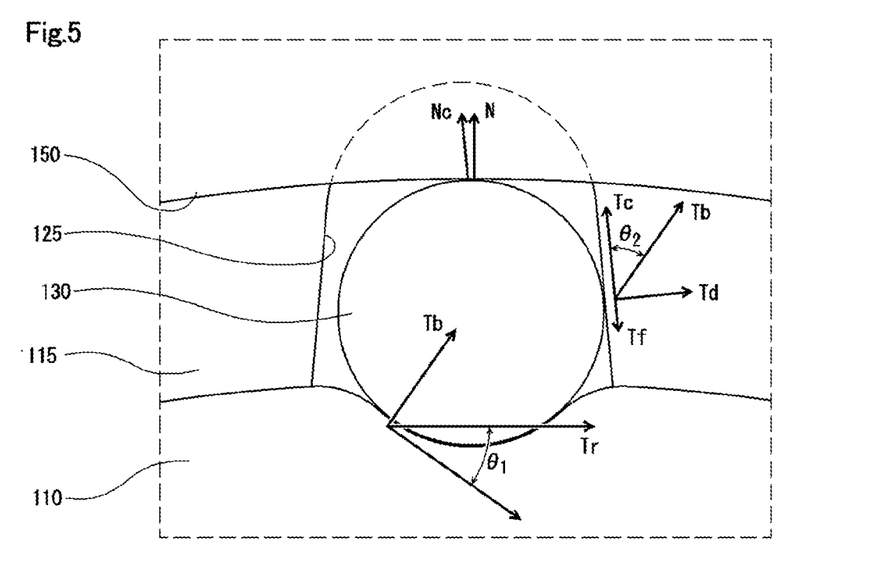
FIG. 5 is a vector diagram for explaining the function of the torque limiter in the positive clutch shown in FIG. 1.

As shown in FIG. 5, when the inner race 110 and outer race 115 engage, the roller 130 receives a normal force Tb [N] expressed as (Tr·sin θ1) from the wall surface of the roller support part 121 of the inner race, where Tr [N] is the load acting on the roller 130. Angle θ1 represents the angle [°] expressed as (90°−θn), where θn is the angle [°] of the load acting surface of the wall of the roller support part 121 holding the roller 130 relative to the radial direction, as shown in FIG. 4.

The pocket part 125 receives a component of force Tc [N] expressed as (Tb·cos θ2) from the roller 130 parallel to the sliding surface in the direction along the wall surface of the pocket part 125, as well as a normal force Td [N] expressed as (Tb·sin θ2) perpendicular to the sliding surface between the roller 130 and the pocket part 125. Angle θ2 represents the angle [°] expressed as (90°−(θn−θg)), where θg is the angle [°] of the sliding surface relative to the radial direction, of the wall surface of the pocket part 125 holding the roller 130, as shown in FIG. 4. Furthermore, a frictional force Tf [N] expressed as (μTd) acts on the sliding surface between the roller 130 and the pocket part 125, where μ represents the friction coefficient of the sliding surface.

The torque limiting member 150 receives a pressing force Nc [N] expressed as (Tc−μTd) from the roller 130 in the direction along the wall surface of the pocket part 125. Namely, the torque limiting member 150 is subjected to a radial pressing force N [N] expressed as (Nc·cos θ2).

Figure 6A:
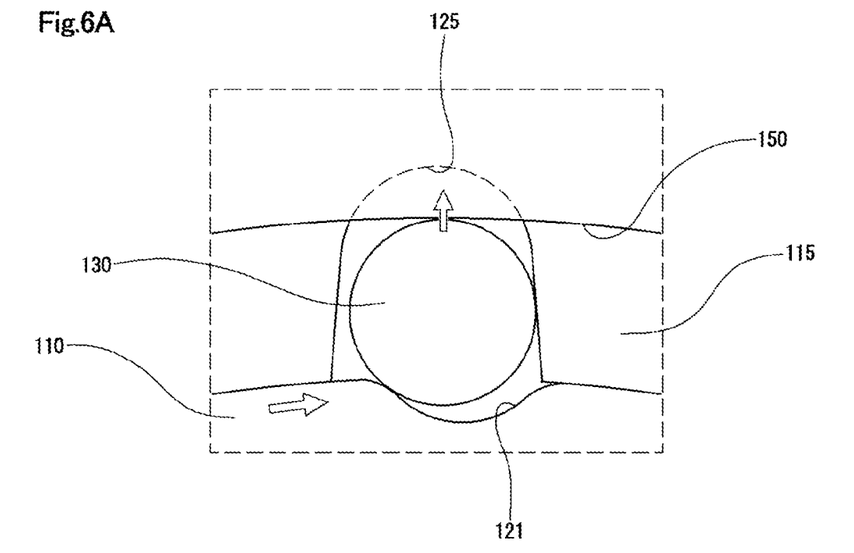
FIG. 6A is a diagram illustrating a state of a torque limiting mechanism activated upon application of torque exceeding a preset level to the inner race in the forward direction.
Figure 6B:
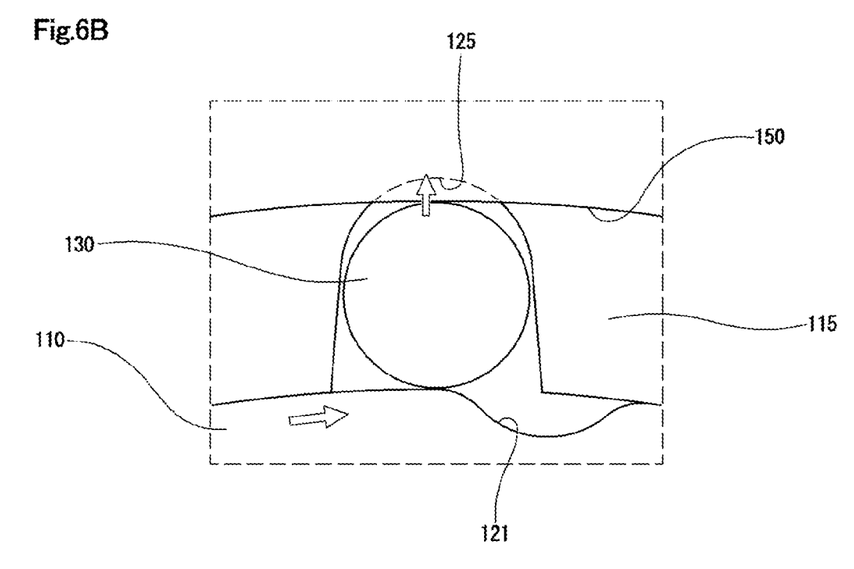
FIG. 6B is a diagram illustrating a state in which the inner race and outer race are disengaged and freed from the torque transmission.

When the input torque is so large as to cause the radial pressing force N to exceed the resilience of the torque limiting member 150, i.e., the radial load applied on the roller 130, the rollers 130 roll and move toward the bottom of the pocket parts 125. This movement allows the torque limiting member 150 to radially expand through resilient deformation as shown in FIG. 6A. As the rollers 130 roll out of the roller support parts 121 onto the outer circumferential surface of the inner race 110 as shown in FIG. 6B, the inner race 110 and outer race 115 disengage and are freed from the torque transmission. This limits the magnitude of torque transmitted between the inner race 110 and the outer race 115.

In this embodiment, as shown in FIG. 4, there is a difference between the angle θn of the load acting surface of the roller support part 121 and the angle θg of the sliding surface of the pocket part 125. This angle difference allows for change of the proportion of the torque limit load carried by the frictional force Tf on the sliding surface between the roller 130 and the pocket part 125, and the torque limit load carried by the resilience of the torque limiting member 150. This feature helps improve performance stability. Moreover, it is possible to customize the trip torque based on the rotating direction of one of the inner race 110 and outer race 115 relative to the other.

In the positive clutch 100 described above, the torque limiting member 150 is a spiral retaining ring. The number of turns of coiling can be suitably changed, for example, to apply a high radial preload. The ring allows for installation in a confined space. Therefore, the clutch is capable of handling high torque with a simple structure, and can be made smaller.

Since spiral retaining rings are circumferentially continuous, there is no need for phase matching when assembling the torque limiting member 150. Increasing the number of turns of coiling can help disperse the stress applied to the torque limiting member 150, ensure strength, and improve durability.

The torque limit load can be set based on the resilience of the torque limiting member 150 and the friction between the sliding surfaces of the rollers 130 and the pocket parts 125. That is, the torque limit load can readily be tailored without dependence on friction coefficients. This helps reduce potential wear on the sliding parts and improve durability. The clutch can thus achieve both compactness and performance stability.

Moreover, the rollers 130 are used as components for causing resilient deformation of the torque limiting members 150. This enables a reduction in the number of components, which in turn facilitates cost savings, size reduction, and structural simplification.

Figure 7:
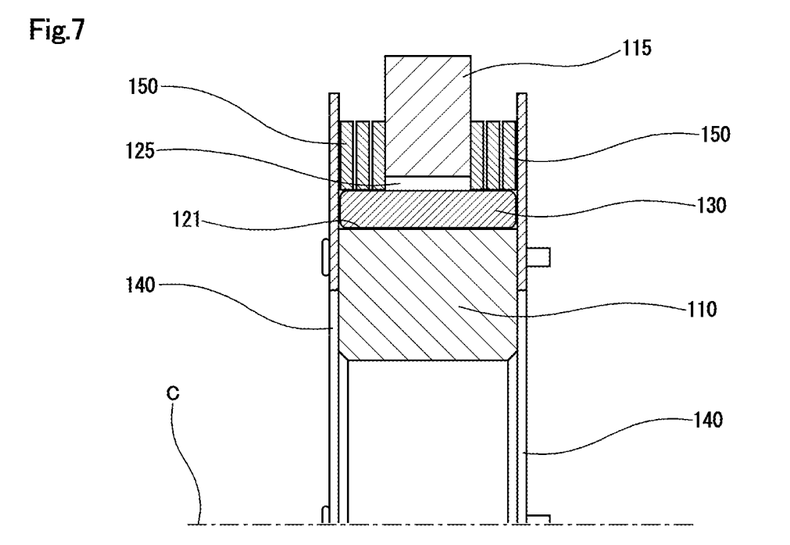
FIG. 7 is a cross-sectional view along the rotation axis illustrating a part of another configuration example of the positive clutch according to the first embodiment of the present invention.

In the positive clutch 100, as described in the first embodiment above, the torque limiting member 150 is a spiral retaining ring made of two turns of flat wire. The number of turns and other features of the spiral retaining ring are not particularly limited and may be set suitably to generate a resilient force matching the necessary torque load. For example, a spiral retaining ring of three turns of flat wire as shown in FIG. 7 may be used as the torque limiting member 150.

Figure 8:
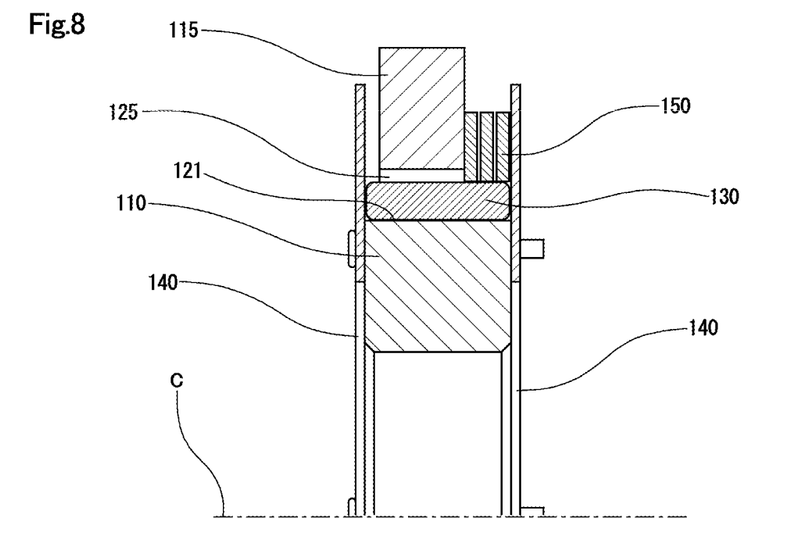
FIG. 8 is a cross-sectional view along the rotation axis illustrating a part of yet another configuration example of the positive clutch according to the first embodiment of the present invention.

In the positive clutch 100 according to the first embodiment described above, torque limiting members 150 are provided such as to apply a load to both axial ends of each of the rollers 130. Instead, a torque limiting member 150 may be provided such as to apply a load to one axial end of each of the rollers 130, as shown in FIG. 8.

In the positive clutch 100 according to the first embodiment described above, the torque limiting member 150 is a spiral retaining ring. Instead, the torque limiting member 150 may be a plurality of C-shaped retaining rings, for example, stacked in the axial direction.

In the positive clutch according to the first embodiment described above, the torque limiting member 150 is fitted on the rollers such that the inner circumferential surface thereof makes contact with the outer circumferential surface of each of the rollers 130 serving as the retaining ring receiving surface. Instead, the torque limiting member 150 may be fitted inside the rollers so that the outer circumferential surface thereof makes contact with the outer circumferential surface of each of the rollers 130 serving as the retaining ring receiving surface.

Second Embodiment

Figure 9:
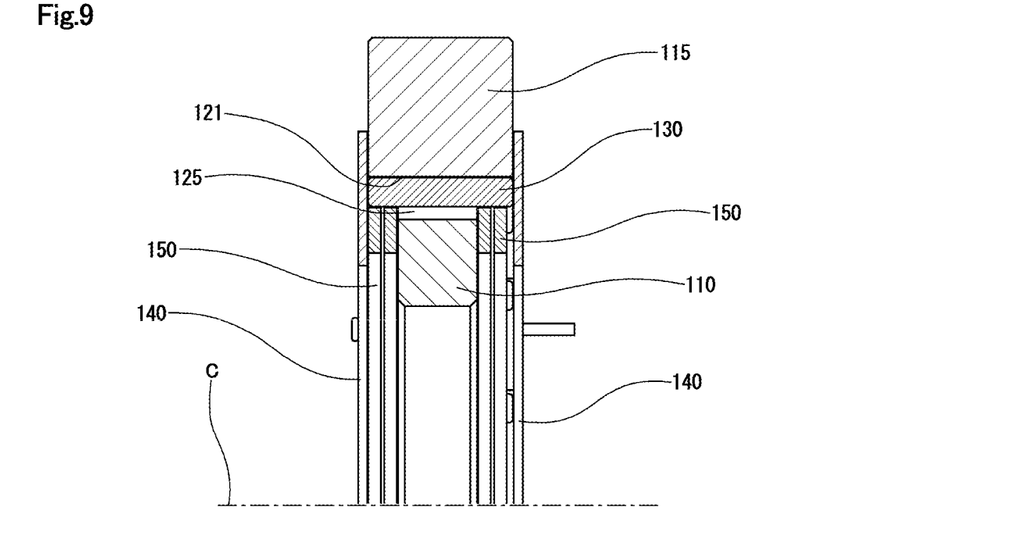
FIG. 9 is a cross-sectional view along the rotation axis illustrating a part of a configuration example of a positive clutch according to a second embodiment of the present invention.
Figure 10:
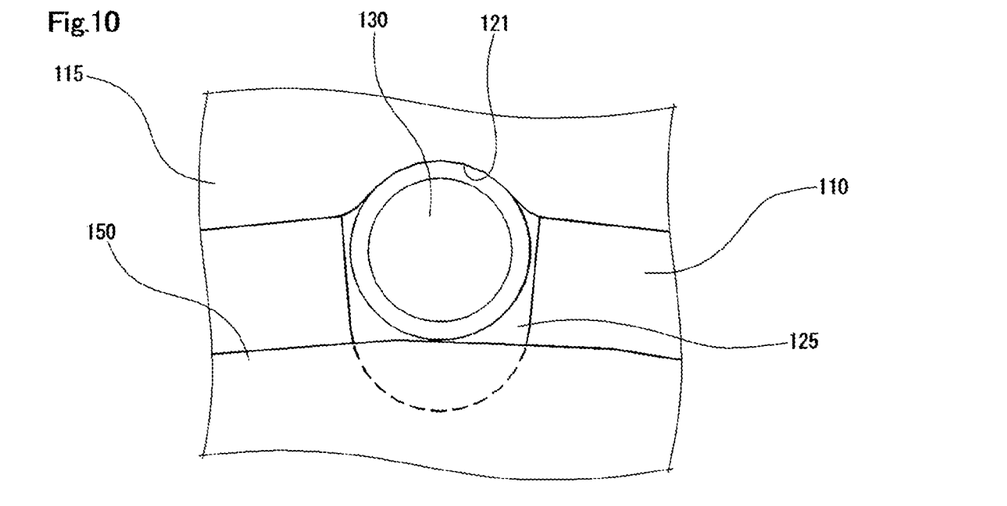
FIG. 10 is a plan view from the front in the axial direction illustrating essential parts of the positive clutch shown in FIG. 9 to a larger scale.

FIG. 9 is a cross-sectional view along the rotation axis illustrating a part of a configuration example of a positive clutch according to a second embodiment of the present invention. FIG. 10 is a plan view from the front in the axial direction illustrating essential parts of the positive clutch shown in FIG. 9 to a larger scale.

In this positive clutch, the roller support parts 121 are formed on the inner circumferential surface of the outer race 115, and the pocket parts 125 are formed on the outer circumferential surface of the inner race 110.

The torque limiting members 150 are fitted on the front side and the rear side of the inner race 110 such that their outer circumferential surfaces make contact with the respective retaining ring receiving surfaces of the rollers 130. The torque limiting members thus apply a radial load to both axial ends of each roller 130, causing the rollers 130 to be pressed against their respective roller support parts 121. In this embodiment, the torque limiting members 150 are two C-shaped retaining rings, for example, stacked in the axial direction. Instead, the torque limiting members 150 may be spiral retaining rings of two turns of flat wire.

In this positive clutch, when the input torque is so large as to cause the radial pressing force of the rollers 130 to exceed the resilience of the torque limiting members 150, the rollers 130 roll and move toward the bottom of the pocket parts to allow the torque limiting members 150 to radially shrink through resilient deformation. As the rollers 130 roll out of the roller support parts 121 onto the inner circumferential surface of the outer race 115, the inner race 110 and outer race 115 disengage and are freed from the torque transmission. This limits the magnitude of torque transmitted between the inner race 110 and the outer race 115.

The positive clutch according to the second embodiment provides the same effects as those of the positive clutch 100 of the first embodiment. Moreover, the centrifugal force during high-speed rotation assists the loading, which ensures more stable engagement and allows the clutch to handle high torque.

Third Embodiment

Figure 11:
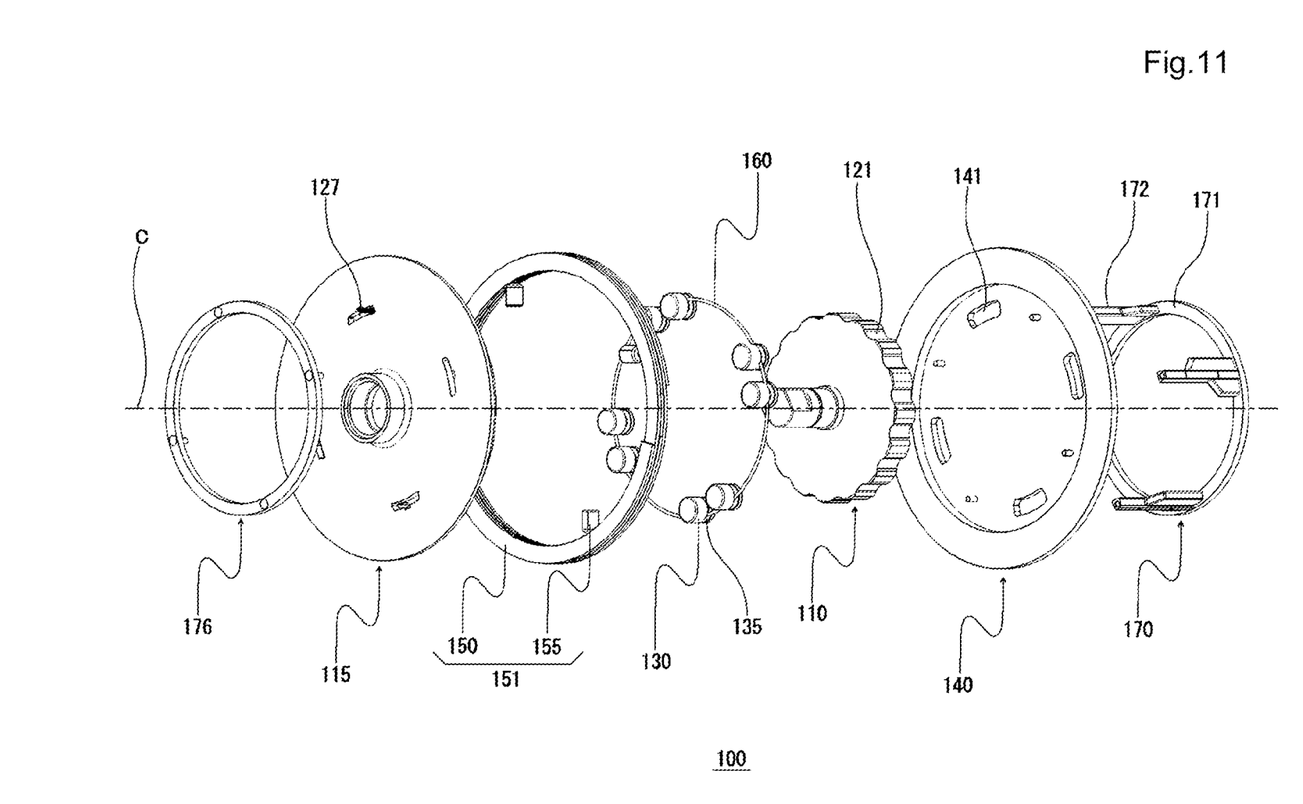
FIG. 11 is an exploded perspective view illustrating a configuration example of a positive clutch according to a third embodiment of the present invention.

FIG. 11 is an exploded perspective view illustrating a configuration example of a positive clutch according to a third embodiment of the present invention.

Figure 12:
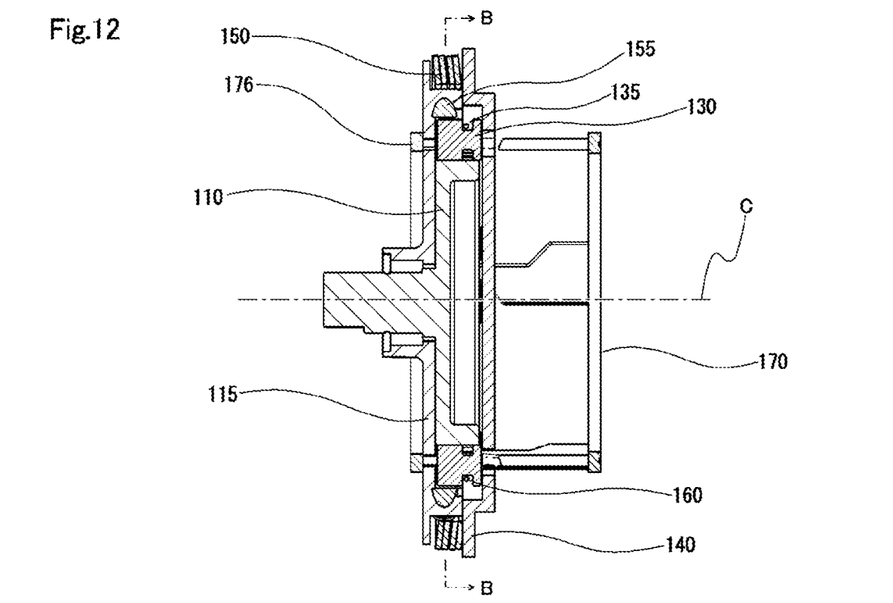
FIG. 12 is a cross-sectional view of a plane along the rotation axis illustrating the configuration of the positive clutch shown in FIG. 11.
Figure 13:
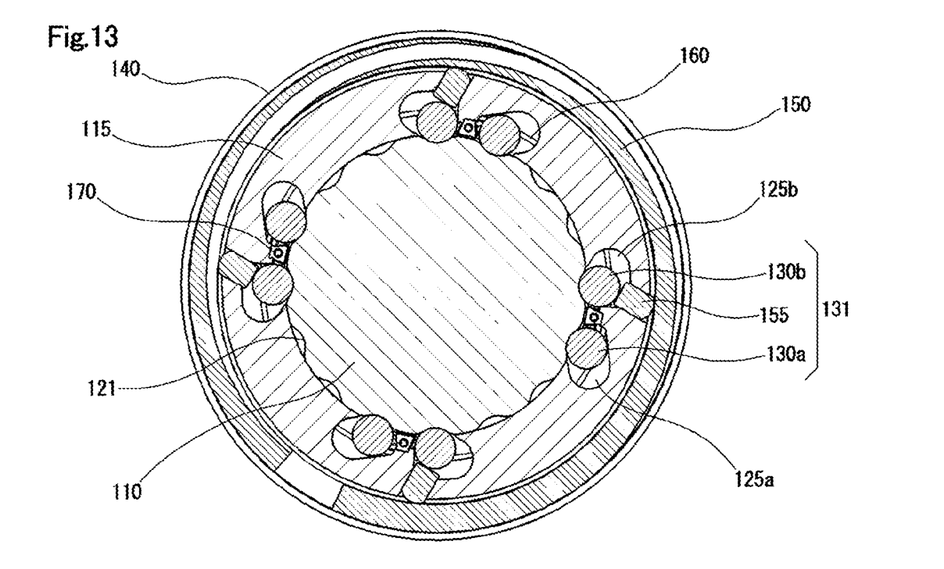
FIG. 13 is a cross-sectional view along the line B-B in FIG. 12.
Figure 14:
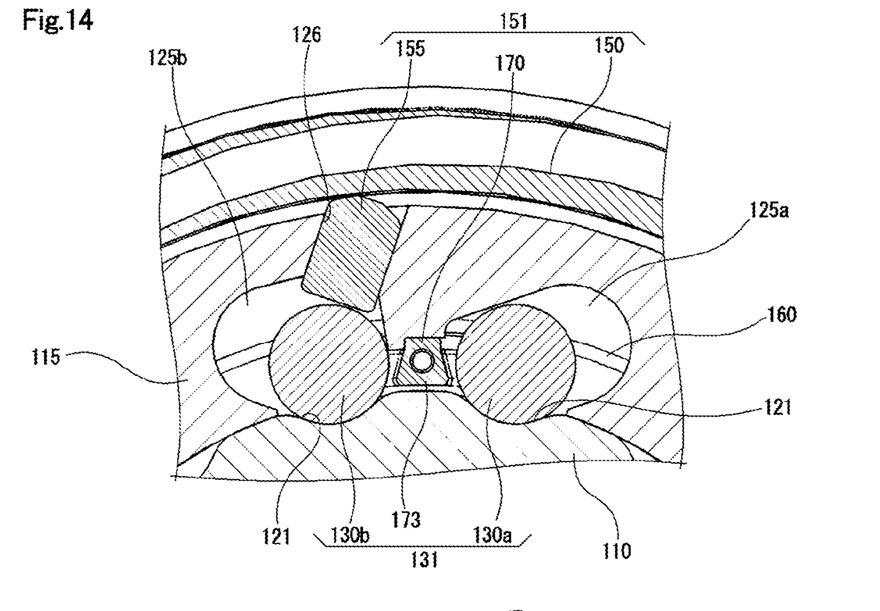
FIG. 14 is an enlarged cross-sectional view illustrating a configuration of essential parts of the positive clutch.

FIG. 12 is a cross-sectional view of a plane along the rotation axis illustrating the configuration of the positive clutch shown in FIG. 11. FIG. 13 is a cross-sectional view along the line B-B in FIG. 12. FIG. 14 is an enlarged cross-sectional view illustrating a configuration of essential parts of the positive clutch.

The positive clutch 100 according to the third embodiment is configured as a selectable clutch that allows switching of the operating modes. The clutch includes an inner race 110 and an outer race 115 rotatable about the same axis relative to each other, a plurality of rollers 130 disposed between the inner race 110 and the outer race 115 for transmission or interruption of torque, a biasing means 160 biasing each of the rollers 130 in the radial direction, a side plate 140 fixed to the rear side of the outer race 115 with screws, for example, and covering the rear side in the axial direction of the outer race, a switching member 170 for switching the operating modes of the positive clutch 100, and a torque limiter 151 configured with a piston mechanism that uses a torque limiting member 150. Reference symbol C in FIG. 11 and FIG. 12 denotes the rotation axis.

The inner race 110 has roller support parts 121 formed at predetermined circumferential intervals on the outer circumferential surface for supporting the lower side of the rollers 130.

In this embodiment, two rollers 130, each held in each of two adjacent roller support parts 121, make a pair. Four roller pairs 131 are arranged circumferentially at equal intervals. Hereinafter, for convenience of explanation, the clockwise direction in FIG. 13 shall be referred to as the forward direction, and the counterclockwise as the reverse direction. One of the rollers 130 of the roller pair 131 located on the side in the forward direction will be referred to as the first roller 130a, and the other of the rollers 130 on the side in the reverse direction as the second roller 130b. Unless otherwise specified, the first roller 130a and second roller 130b will be referred to simply as roller(s) 130.

The number of roller pairs 131 is not limited to a particular number, and may be changed as required corresponding to a target torque capacity. The roller pairs 131 need not be equally spaced apart.

In the inner circumferential surface of the outer race 115 are formed first pocket parts 125a corresponding to the first rollers 130a of the roller pairs 131, extending at an angle in the forward direction radially outwards. Second pocket parts 125b corresponding to the second rollers 130b of the roller pairs 131 extend at an angle in the reverse direction radially outwards.

The first pocket parts 125a and second pocket parts 125b are configured to be able to accommodate one roller 130 each inside to allow the rollers 130 to separate from the inner race 110.

The biasing means 160 is a garter spring, for example. The rollers 130 each have a circumferentially extending mounting groove 135 on the outer circumferential surface. The biasing means is mounted in these mounting grooves. Using a garter spring as the biasing means 160 eliminates the need to provide multiple biasing means corresponding to each of the rollers 130. This reduces the number of components and helps reduce the size of the clutch.

Figure 15:
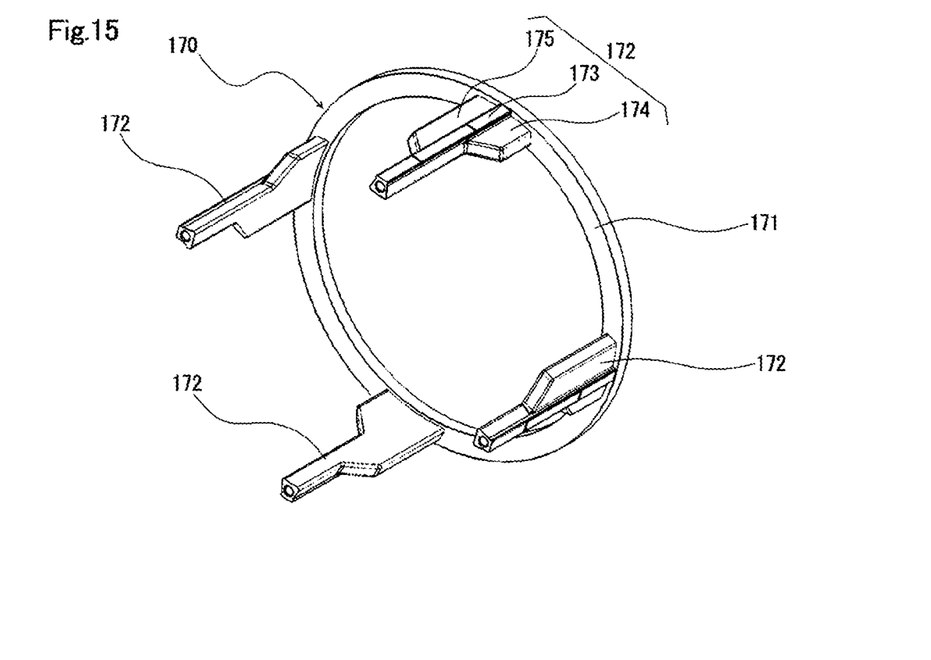
FIG. 15 is a perspective view illustrating the configuration of a switching member.

The switching member 170 is configured to be moved in the axial direction independently of the rotation of the inner race 110 and outer race 115. This axial movement causes one or both of the first rollers 130a and second rollers 130b to move into the corresponding pocket parts, to allow the positive clutch 100 to be switched between operating modes. The switching member 170 includes, as shown in FIG. 15, an annular plate-like base part 171, and a plurality of roller position changing parts 172 integrally formed on the front face of the base part 171 to extend in the axial direction, each corresponding to each of the roller pairs 131.

Each roller position changing part 172 has a pillar part 173, a first pressing part 174 on one side in the forward direction of the pillar part 173 for pressing the first roller 130a, and a second pressing part 175 on the side in the reverse direction of the pillar part 173 for pressing the second roller 130b.

The first pressing part 174 is located further towards the rear in the axial direction than the second pressing part 175. By tailoring the amount of axial movement of the switching member 170, it is possible to change the positions of the second rollers 130b alone of the roller pairs 131, or the positions of both of the first rollers 130a and second rollers 130b.

The roller position changing parts 172 are each passed through respective through holes 141 formed in the side plate 140. The pillar part 173 of each roller position changing part is positioned radially close to the inner race 110 between the first roller 130a and the second roller 130b of the corresponding roller pair 131.

The distal ends of the roller position changing parts 172 pass through and extend out from through holes 127 in the outer race 115. An annular plate-like retainer member 176 is fixed to the front end face of each roller position changing part with screws, for example.

The torque limiter 151 includes piston members 155, and the torque limiting member 150 in contact with the piston members 155 and applying a constant load on the piston members 155. The piston member 155 is a columnar body that is formed by cutting one end of the column in a plane inclined to the center axis.

In this embodiment, as shown in FIG. 14, the torque limiter 151 has the piston members each provided to the second roller 130b in each roller pair 131 and located on one side in the forward direction of the second roller 130b. Piston member accommodating holes 126 are formed in the wall surface on the radially outer side of the second pocket parts 125b of the outer race 115. The piston members 155 are slidably accommodated in the holes, with one end protruding beyond the outer circumferential surface of the outer race 115. The piston members 155 are oriented such that their center axis is inclined toward the forward direction relative to the radial direction. The second roller 130b can be held in the circumferential direction between the flat surface at the distal end of the piston member 155 and the roller support part 121.

In this embodiment, the torque limiting member 150 is two spiral retaining rings of two turns of flat wire stacked in the axial direction. The torque limiting member 150 is fitted on the rear side of the outer race 115 such that the inner circumferential surface makes contact with each of the piston members 155. The torque limiting member thus applies a radial load to press the rollers 130 against their respective roller support parts 121.

In the positive clutch 100 according to this embodiment, when the switching member 170 is fixed at the first fixed position where the retainer member 176 is in contact with the front face of the outer race 115 as shown in FIG. 12, the inner race 110 and outer race 115 engage via the second rollers 130b, which are held between the roller support parts 121 and the piston members 155 in the circumferential direction when the inner race 110 is rotated in the forward direction relative to the outer race 115, for example. When the inner race 110 is rotated in the reverse direction relative to the outer race 115, the inner race 110 and outer race 115 engage via the first rollers 130a that are held between the roller support parts 121 and the first pocket parts 125a in the circumferential direction. The operating mode of the positive clutch 100 is therefore the two-way lock mode that prohibits relative rotation of the inner race 110 and outer race 115 in both forward and reverse directions.

Figure 16A:
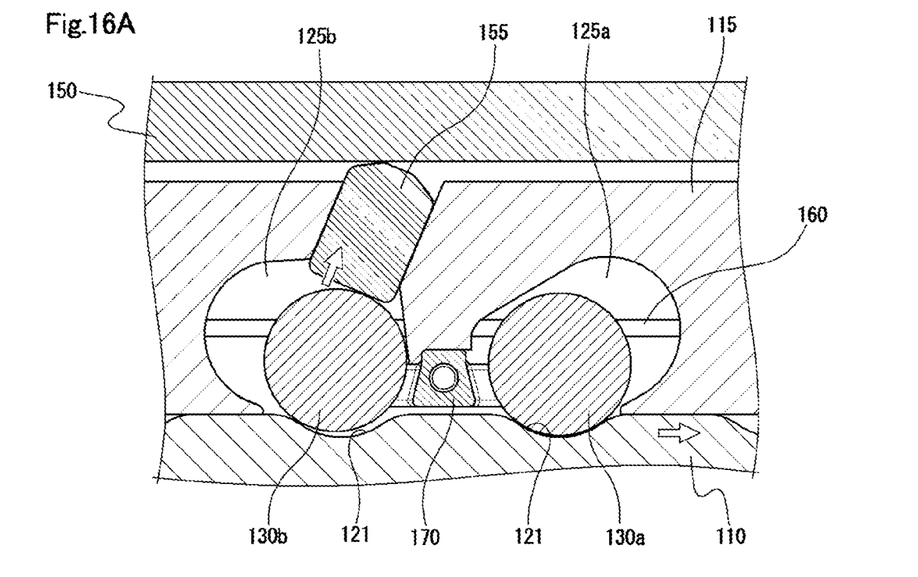
FIG. 16A is a diagram illustrating a state of a torque limiting mechanism activated upon application of torque exceeding a preset level to the inner race in the forward direction.
Figure 16B:
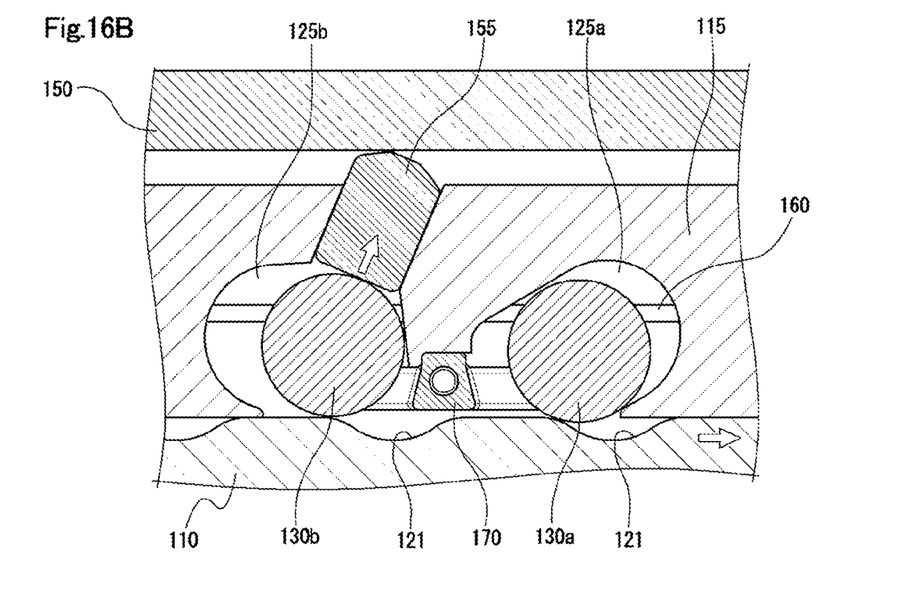
FIG. 16B is a diagram illustrating a state in which the inner race and outer race are disengaged and freed from the torque transmission.

A preset torque is determined by the friction between the sliding surfaces of the piston members 155 and the piston member accommodating holes 126, and the resilience of the torque limiting member 150. When torque exceeding this preset level is applied during forward rotation of the inner race 110 relative to the outer race 115, the second rollers 130b roll and move toward the bottom of the second pocket parts 125b as shown in FIG. 16A, pressing the piston members 155 and causing the torque limiting member 150 to radially expand through resilient deformation. As the second rollers 130b roll out of the roller support parts 121 onto the outer circumferential surface of the inner race 110 as shown in FIG. 16B, the inner race 110 and outer race 115 disengage and are freed from the torque transmission. This limits the magnitude of torque transmitted between the inner race 110 and the outer race 115.

As with the first embodiment, the angle of the load acting surface of the roller support part 121 and the inclination angle of the flat portion of the piston member 155 may be the same, or different. An angle difference between the load acting surface of the roller support part 121 and the inclination of the flat portion of the piston member 155 allows for change of the proportion of the torque limit load carried by the friction between the sliding surfaces of the piston members 155 and the piston member accommodating holes 126, and the torque limit load carried by the resilience of the torque limiting member 150. This helps improve performance stability.

Figure 17A:
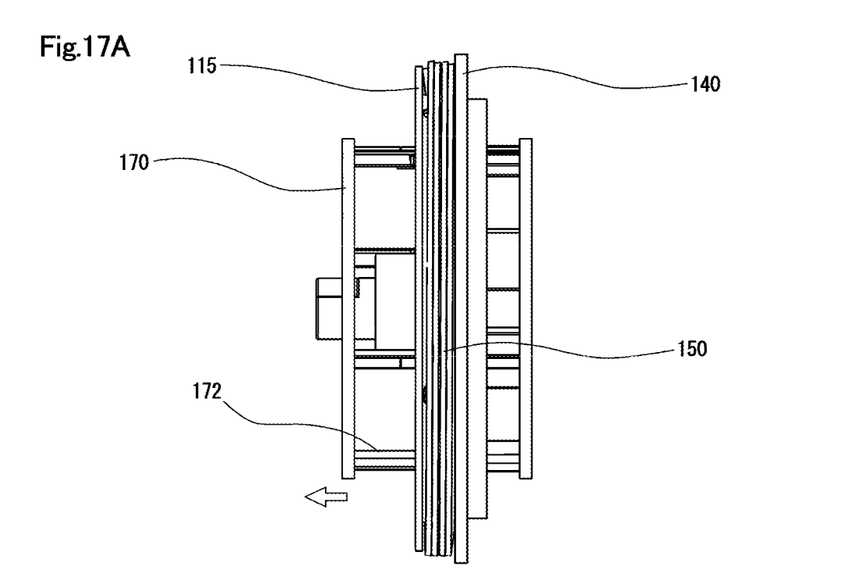
FIG. 17A is a side view illustrating a state of the positive clutch shown in FIG. 11 when the operating mode is a one-way lock mode.
Figure 17B:
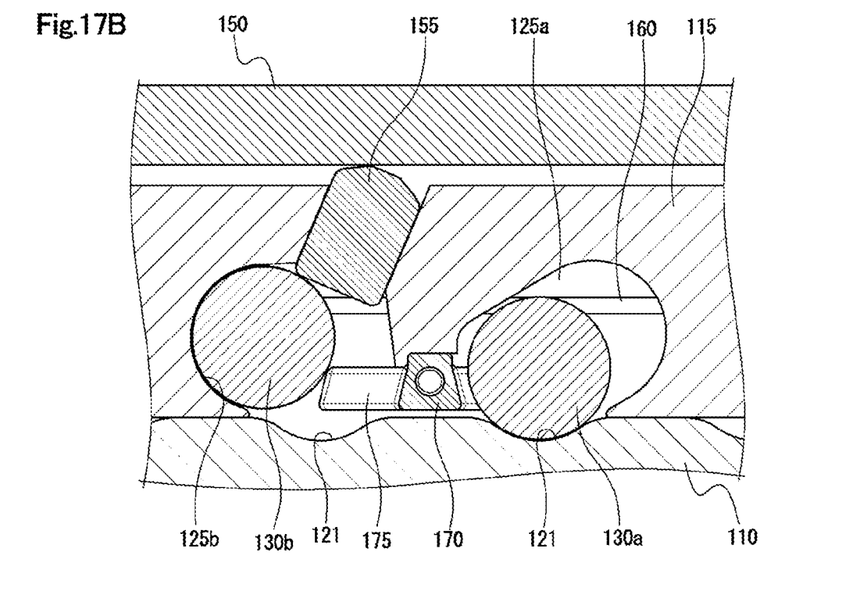
FIG. 17B is a schematic diagram illustrating the state of a first roller and a second roller when the operating mode of the positive clutch shown in FIG. 11 is the one-way lock mode.

In this positive clutch 100, when the switching member 170 is moved to the front side in the axial direction as shown in FIG. 17A, and fixed in the second fixed position, only the second roller 130b of each roller pair 131 is moved into the second pocket part 125b by the action of the second pressing part 175 of the roller position changing part 172 as shown in FIG. 17B. The second roller 130b is thereby kept separated from the inner race 110, and thus the operating mode of the positive clutch 100 is switched to the one-way lock mode that prohibits reverse rotation of the inner race 110 relative to the outer race 115.

Although not shown, the first pressing part 174 of the switching member 170 may be formed at a position on the front side in the axial direction relative to the second pressing part 175, for example. It is then possible to hold only the first roller 130a of each roller pair 131 separated from the inner race 110 by fixing the switching member 170 in the second fixed position. The positive clutch 100 can thus be switched to the one-way lock mode that prohibits forward rotation of the inner race 110 relative to the outer race 115.

Figure 18A:
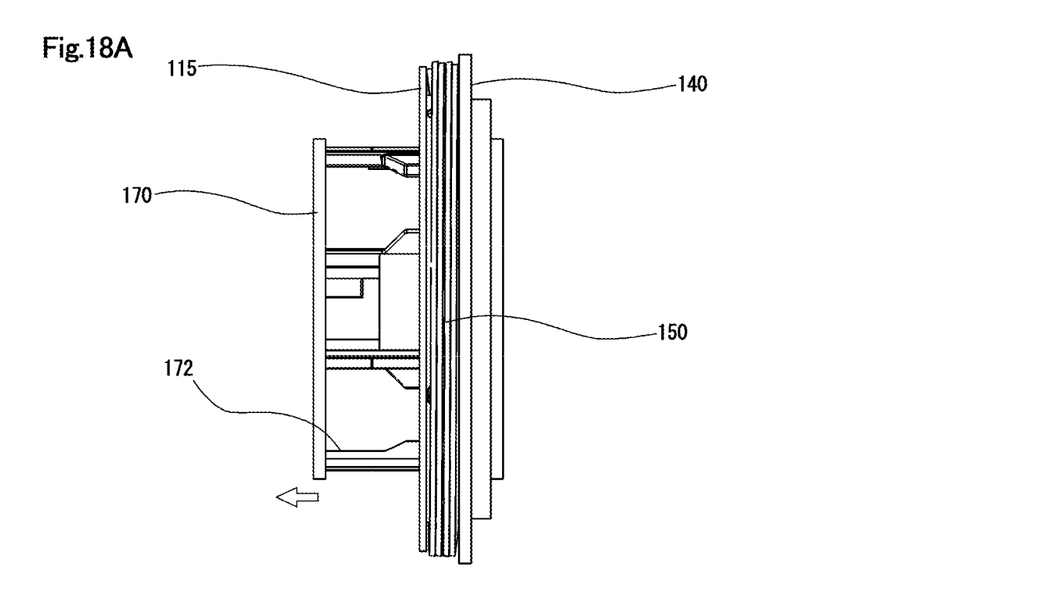
FIG. 18A is a side view illustrating a state of the positive clutch shown in FIG. 11 when the operating mode is a two-way free mode.
Figure 18B:
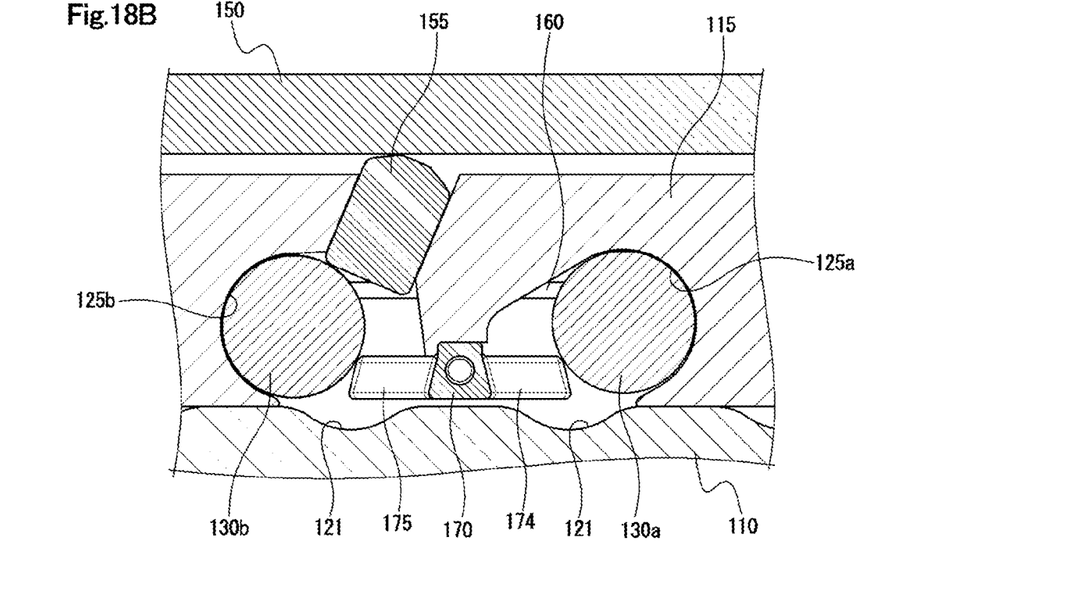
FIG. 18B is a schematic diagram illustrating the state of the first roller and second roller when the operating mode of the positive clutch shown in FIG. 11 is the two-way free mode.

When the switching member 170 is moved to the front side in the axial direction as shown in FIG. 18A, and fixed in the third fixed position where the base part 171 of the switching member 170 makes contact with the rear face of the side plate 140, the first roller 130a of each roller pair 131 is moved into the first pocket part 125a by the action of the first pressing part 174 of the roller position changing part 172 as shown in FIG. 18B. The first rollers 130a and second rollers 130b are thus both held in the position separated from the inner race 110. The operating mode of the positive clutch 100 is thus switched to the two-way free mode that allows relative rotation of the inner race 110 and outer race 115 in both the forward and reverse directions.

The positive clutch 100 according to the third embodiment provides the same effects as those of the positive clutch 100 of the first embodiment. Moreover, with the piston mechanism that uses the torque limiting member 150 employed as the torque limiter 151, the clutch can achieve both compactness and performance stability.

In the third embodiment described above, the torque limiter 151 has piston members each provided on the side in the forward direction of each second roller 130b of each roller pair 131. Alternatively, the torque limiter 151 may have piston members each provided on the side in the forward direction of each first roller 130a, or the torque limiter 151 may have piston members each provided for each of the first rollers 130a and second rollers 130b. With piston members provided in the torque limiter 151 for both of the first rollers 130a and second rollers 130b, the torque limit load can be changed in each of the forward and reverse directions. This facilitates an improvement in performance stability, as well as provides a high degree of design freedom.

In the third embodiment described above, the roller support parts 121 are formed on the outer circumferential surface of the inner race 110 while the first pocket parts 125a and second pocket parts 125b are formed on the inner circumferential surface of the outer race 115. The torque limiting member 150 is fitted onto the outer race 115 so that its inner circumferential surface makes contact with the piston members 155 disposed in the outer race 115. Instead, the roller support parts 121 may be formed on the inner circumferential surface of the outer race while the pocket parts may be formed on the outer circumferential surface of the inner race. The torque limiting member may be fitted in the inner race so that its outer circumferential surface makes contact with the piston members disposed in the inner race.

In the third embodiment described above, the positive clutch 100 is configured to be switchable between a two-way lock mode, a one-way lock mode, and a two-way free mode. The positive clutch may be configured to be switchable between four operating modes including a one-way lock mode that prohibits forward rotation of the inner race relative to the outer race, and a one-way lock mode that prohibits reverse rotation of the inner race relative to the outer race.

In the configuration described above, when switching the positive clutch between operating modes, the rollers 130 are separated from the roller support parts 121 by moving the switching member 170 in the axial direction independently of the rotation of the inner race 110 and outer race 115. Alternatively, the switching member may be designed to separate the rollers from the roller support parts by rotating independently of the rotation of the inner race and outer race.

While embodiments of the present invention have been described in detail, the present invention is not limited to the above-described embodiments and may be carried out with various design changes without departing from the scope of the present invention set forth in the claims.

For example, while the inner race is fixed and the outer race is rotated in the configurations of the embodiments described above, other configurations are also possible, such as an inner race being rotated relative to a fixed outer race, or the inner race and outer race being both rotatable.

What is claimed is:

1. A positive clutch comprising:
an inner race and an outer race that are coaxial and rotatable relative to each other; and
a plurality of rollers disposed between the inner race and the outer race and transmitting or interrupting torque, the inner race and the outer race being configured to engage with each other via part or all of the plurality of rollers held in a circumferential direction between roller support parts and pocket parts, the roller support parts being formed on one of an outer circumferential surface of the inner race and an inner circumferential surface of the outer race, and the pocket parts being formed on the other of the outer circumferential surface of the inner race and the inner circumferential surface of the outer race and being configured to accommodate the rollers,
the positive clutch further comprising a torque limiting member that applies a radial load on the rollers to press the rollers against the roller support parts, the torque limiting member being coaxial with the inner race and the outer race, and being flat and annular in an axial direction, and moreover being resiliently deformable in a radial direction,
wherein the torque limiting member is a spiral retaining ring.

2. The positive clutch according to claim 1, wherein the rollers each have an outer circumferential surface serving as a retaining ring receiving surface, and
an outer circumferential surface or an inner circumferential surface of the torque limiting member is in contact with the retainer ring receiving surfaces of the plurality of rollers so as to apply a load to one or both axial ends of each of the plurality of rollers.

3. The positive clutch according to claim 1, wherein there is an angle difference between a wall surface of the roller support part and a wall surface of the pocket part that hold each of the rollers.

4. The positive clutch according to claim 1, wherein the plurality of rollers include first rollers held between the roller support parts and the pocket parts in the circumferential direction when one of the inner race and the outer race is rotated relative to the other in a forward direction, and second rollers held between the roller support parts and the pocket parts in the circumferential direction when one of the inner race and the outer race is rotated relative to the other in a reverse direction,
the positive clutch further comprising:
a biasing means that biases both the first rollers and the second rollers in the radial direction;
a switching member that switches operating modes of the positive clutch by causing one or both of the first rollers and the second rollers to move into corresponding pocket parts against a biasing force of the biasing means; and
piston members each having a flat portion for holding the first rollers between the first rollers and the roller support parts or the pocket parts, and/or piston members each having a flat portion for holding the second rollers between the second rollers and the roller support parts or the pocket parts,
the torque limiting member having an outer circumferential surface or an inner circumferential surface in contact with the piston members.

5. A positive clutch comprising:
an inner race and an outer race that are coaxial and rotatable relative to each other; and
a plurality of rollers disposed between the inner race and the outer race and transmitting or interrupting torque, the inner race and the outer race being configured to engage with each other via part or all of the plurality of rollers held in a circumferential direction between roller support parts and pocket parts, the roller support parts being formed on one of an outer circumferential surface of the inner race and an inner circumferential surface of the outer race, and the pocket parts being formed on the other of the outer circumferential surface of the inner race and the inner circumferential surface of the outer race and being configured to accommodate the rollers,
the positive clutch further comprising a torque limiting member that applies a radial load on the rollers to press the rollers against the roller support parts, the torque limiting member being coaxial with the inner race and the outer race, and being flat and annular in an axial direction, and moreover being resiliently deformable in a radial direction,
wherein the rollers each have an outer circumferential surface serving as a retaining ring receiving surface, and
an outer circumferential surface or an inner circumferential surface of the torque limiting member is in contact with the retainer ring receiving surfaces of the plurality of rollers so as to apply a load to one or both axial ends of each of the plurality of rollers.

6. A positive clutch comprising:
an inner race and an outer race that are coaxial and rotatable relative to each other; and
a plurality of rollers disposed between the inner race and the outer race and transmitting or interrupting torque, the inner race and the outer race being configured to engage with each other via part or all of the plurality of rollers held in a circumferential direction between roller support parts and pocket parts, the roller support parts being formed on one of an outer circumferential surface of the inner race and an inner circumferential surface of the outer race, and the pocket parts being formed on the other of the outer circumferential surface of the inner race and the inner circumferential surface of the outer race and being configured to accommodate the rollers,
the positive clutch further comprising a torque limiting member that applies a radial load on the rollers to press the rollers against the roller support parts, the torque limiting member being coaxial with the inner race and the outer race, and being flat and annular in an axial direction, and moreover being resiliently deformable in a radial direction,
wherein there is an angle difference between a wall surface of the roller support part and a wall surface of the pocket part that hold each of the rollers.

* * * * *